Oct. 22, 1968 A. BARRY ET AL 3,406,778
SEISMIC WAVE SOURCE FOR USE AT MARINE LOCATIONS
Filed July 28, 1967 2 Sheets-Sheet 1

ADELBERT BARRY  INVENTORS
FRANKLIN L. CHALMERS
JOHN B. PEARSON
BY John B Davidson
ATTORNEY Oct. 22, 1968  A. BARRY ET AL  3,406,778
SEISMIC WAVE SOURCE FOR USE AT MARINE LOCATIONS
Filed July 28, 1967  2 Sheets-Sheet 2

SECTION 3-3

VIEW 5-5

VIEW 4-4

ADELBERT BARRY INVENTORS
FRANKIN L. CHALMERS
JOHN B. PEARSON
BY John B Davidson
ATTORNEY United States Patent Office 3,406,778
Patented Oct. 22, 1968

3,406,778
SEISMIC WAVE SOURCE FOR USE AT
MARINE LOCATIONS
Adelbert Barry, Franklin L. Chalmers, and John B. Pearson, Houston, Tex., assignors to Esso Production Research Company, a corporation of Delaware
Filed July 28, 1967, Ser. No. 656,866
5 Claims. (Cl. 181—.5)

ABSTRACT OF THE DISCLOSURE

A seismic wave source includes opposed plates connected together by a gas impervious convoluted resilient bellows spring to form an expansible chamber. Combustible gas is injected into the chamber and ignited to produce a seismic pulse. Means are provided for venting to atmosphere the products of combustion.

BACKGROUND OF THE INVENTION

This invention is directed to seismic sources for use at marine locations and more particularly to marine seismic sources using a fluid-expandable enclosure.

In the course of seismic prospecting at marine locations, it has been customary in the past to use dynamite as a source of seismic waves. While it is possible to successfully conduct seismic exploration using dynamite as the seismic wave source, dynamite suffers from a number of very serious shortcomings peculiar to its use at marine locations. Seismic waves produced by dynamite are of a very broad spectrum of frequencies concentrated at the high end of what is generally considered to be the useful seismic frequency range. This is particularly true at marine locations inasmuch as the cavitation and bubbling produced by exploding dynamite in the water result in the production of high-frequency waves. Furthermore, since the seismic waves produced by bubbling and cavitation are not relatable to the time break or instant of detonation of the dynamite, they obscure the useful seismic information on the resulting seismograms and make the interpretation of the seismograms exceedingly difficult. This is compounded by the fact that the cavitation and the bubbling continues for a substantial period of time after the detonation of the dynamite.

In the past there have been many efforts made to develop seismic generators which are not dependent upon dynamite as an energy source. The most promising of these use various expandable fluids as the source of energy, such as explosive gaseous mixtures and gas under high pressure. When explosive gas mixtures are used, the mixture is introduced into an expansible enclosure and is detonated within the enclosure. Comubustion products are vented to the earth's surface to eliminate bubbling. Seismic wave sources using compressed gases, such as compressed air, generally dump the compressed air into the water to produce an elastic wave impulse. The sources that have found commercial acceptance to date suffer from serious shortcomings that limit their use, such as being very difficult to handle at marine locations and producing large bubble pulses that result in extraneous seismic waves which obscure seismic records.

Accordingly, one object of the present invention is to provide a marine seismic source that can easily be handled at marine locations, that requires a minimum of service work thereon, and that produces seismic waves of large amplitude capable of penetrating the earth to great depths.

SUMMARY OF THE INVENTION

In accordance with one aspect of the invention, there is provided a seismic source for use in an aqueous medium, such as at marine locations, which utilizes first and second opposed metal plates. The metal plates are connected together by an annular, convoluted, resilient bellows spring which is substantially impervious to gas, to form an expansible enclosure. Connected to one of the plates there is provided an actuating means for substantially instantaneously increasing the pressure within the space by three to ten to thereby produce a seismic pulse. Preferably the actuating means comprises valve means for mixing quantities of gases such as oxygen and propane which form an explosve mixture, and port means for introducing the explosive gaseous mixture into the space between the plates and within the bellows spring. Preferably there is also included conduit means connected to one of the plates, for venting the interior of the enclosure to the atmosphere when the pressure within the enclosure is of predetermined magnitude. Check valve means in the conduit means permits one-way flow of gas through the conduit means. Further it has been found that the weight of the seismic source can be greatly reduced by dishing the opposed metal plates inwardly of the enclosure. The reduction in weight is sufficient that an easily towable marine seismic source is provided.

Objects and features of the invention not apparent from the above discussion will become evident upon consideration of the following detailed description of the invention taken in connection with the accompanying drawings.

DESCRIPTION OF THE PREFERRED EMBODIMENT

Figure 1:
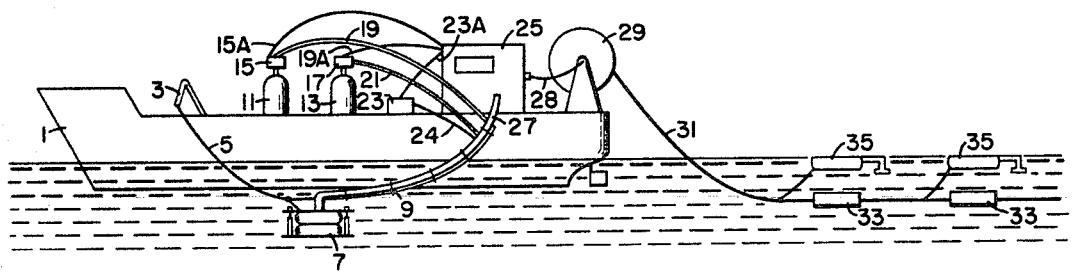
FIG. 1 illustrates apparatus for seismic surveying at marine locations in accordance with the present invention.

With reference to FIG. 1 there is illustrated a marine vessel 1 for handling personnel and equipment for seismic exploration. Connected to an extensible reel on the deck of the vessel 1 by means of pulling line 5 is a seismic source 7. Storage enclosures for oxygen and an explosive gas such as propane or acetylene are designated by reference numerals 11 and 13 and are carried aboard the ship. Enclosures 11 and 13 are connected to the seismic source 7 through proportioning solenoid valves 15 and 17, respectively, and through gas lines 19 and 21, respectively. A conventional firing box 23, which is a high-voltage source actuated by a cam-actuated switch such as is illustrated in U.S. Patent 3,198,282, is connected to the sound source through electrical leads 24 for the purpose of electrically energizing a spark plug for igniting explosive gas within the seismic source 7. The solenoid valves 15 and 17 and the firing box 23 are connected to a seismic recorder 25 through lines 15A, 19A, and 23A. An electrical source and cam-actuated switches may be provided in the recorder for opening the solenoid valves and energizing the firing box at appropriate times in the recording interval. Solenoid valves 15 and 17 will be actuated at the end of a recording interval whereas firing box 23 will be actuated at the beginning of the recording interval. A weighted geophone cable 31 comprising a plurality of active cable sections 33 (i.e., cable sections containing geophones) is connected to a conventional cable reel so as to be windable thereon. A plurality of cable floats 35 are connected to the cable so as to suspend the active sections of the cable at an appropriate depth in the water. As is usual, the electrical connection from the recorder 25 to the active cable sections 33 is through electrical leads 28 between the recorder and the reel and the electrical leads running the length of the cable.

Figure 2:
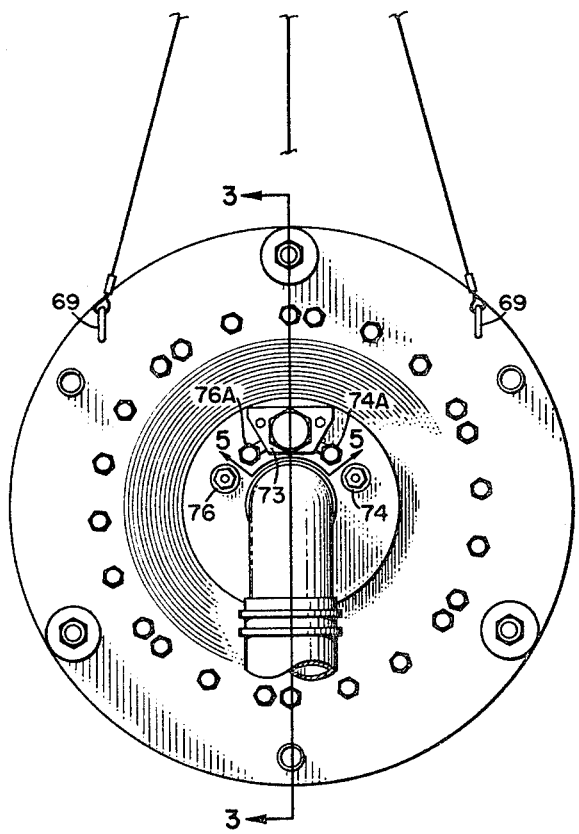
FIG. 2 is an end view of one apparatus in accordance with the invention.
Figure 3:
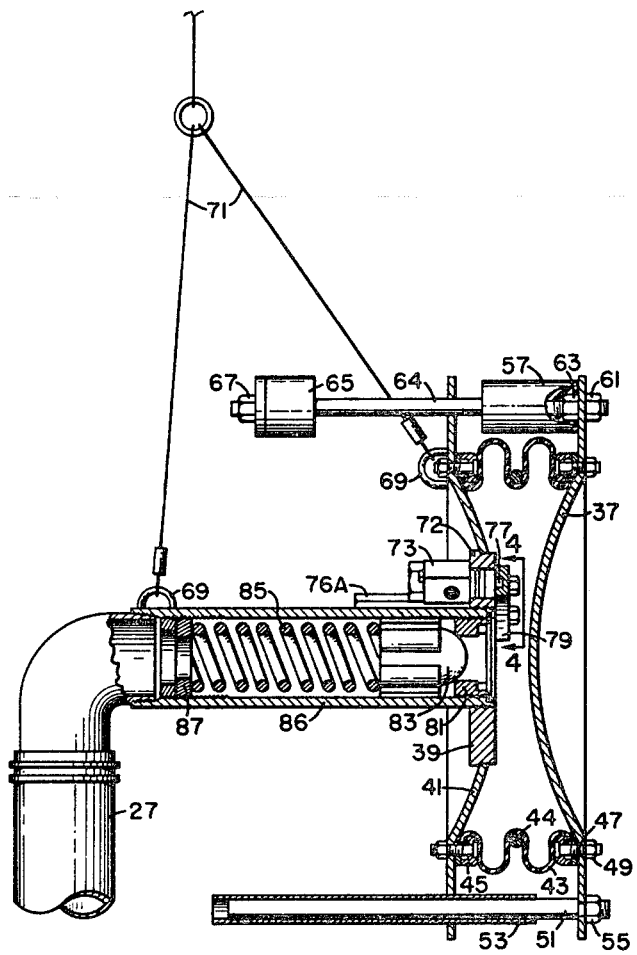
FIG. 3 is a sectional view taken along section 3—3 of FIG. 2.
Figure 5:
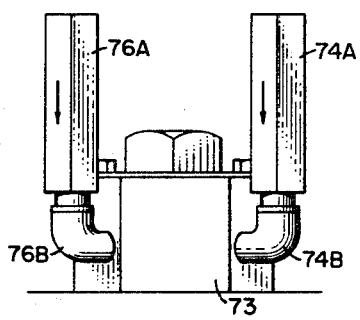
FIG. 5 is a perspective view of the check valves and fuel mixing chamber of FIG. 1.
Figure 4:
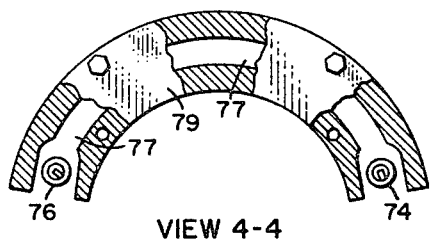
FIG. 4 is a side view of the mixed fuel channel 77 of FIG. 3.

With reference now to FIGS. 2, 3 and 4, there is illustrated a preferred embodiment of a seismic wave source in accordance with the present invention. A substantially gas-tight enclosure is formed by a pair of opposed plates 41 and 37 which are connected by an annular convoluted bellows spring 43. Spring 43 may be formed of rubber or a rubber like material reinforced with fiber and may be of the type manufactured by Firestone Tire and Rubber Company and designated as an "AirRide No. 29." A circular metal rod 44 is provided between convolutions to maintain hoop stress. A pair of annular clamps designated by the reference numeral 45 and secured to the metal plate corresponding thereto by means of bolts 47 and nuts 49 affixes the ends of the bellows springs 43 to the metal plates. Plates 37, 41 are dished inwardly of the enclosure for the purpose of increasing the strength of the structure without increasing the weight thereof. Were the plates flat, the thickness thereof would have to be increased many times to prevent buckling under the gaseous pressures within the enclosure. Preferably the dished contour is a portion of a sphere.

The plates 37, 41 are also connected together by an elongated rod 64 which is secured to plate 37 by means of nuts 61, 63. The rod 64 extends through matching holes in the plate 41. Rubber bumper stops 57–65 are provided for the purpose of limiting the movement of plates 37, 41 relative to each other. Three such rods 64 are illustrated in the drawings, but more may be provided if such be considered necessary. For the purpose of preventing the plates from being held in one position by slantwise cocking of the rod 64, a plurality of guide tubes 53 are affixed to the plate 41 through which extend guide rods 51 which are affixed to the plate 37 by nuts 55. Here again, three such guide rods and guide tubes are illustrated although more may be provided is desired. Lines 19 and 21 are respectively connected to a fuel mixing chamber 73 through a pair of check valves 76A and 74A, and elbows 76B and 74B. The fuel mixing chamber 73 is affixed to plate 41 by an annular connecting member 72. A pair of spark plugs 74 and 76 are also affixed to the plate 41 on either side of the connection to the mixing chamber 73. An arcuate fuel manifold 79 having a channel 77 therein (see FIG. 4) conducts the gaseous mixture from the mixing chamber 73 past the spark plugs 74–76 to ensure that sparks produced by the spark plugs 74 and 76 will ignite the explosive gaseous mixture in the chamber defined by the plates 37, 41 and the bellows spring 43.

For the purpose of exhausting spent gases from the combustion chamber, there is provided an exhaust valve housing 86 connected between plate 41 and an exhaust conduit 27 leading to the water surface and the atmosphere. Within the exhaust valve housing 86 there is positioned an exhaust valve comprising a valve seat 81 and a movable valve member 83 which has a generally spherical portion adapted to engage the valve seat 81. The movable valve member 83 is normally urged against the valve seat by means of a coil spring 85 positioned between the movable valve member 83 and an adjustable nut 87. The pressure within the combustion chamber that is required to unseat the valve member 83 may be adjusted by suitably adjusting the nut 87. A portion of the housing 86 is internally threaded to receive the nut 87. The movable valve member 83 should have high inertia so that it will not unseat immediately upon detonation of gas within the combustion chamber by ignition of the spark plugs 74 and 76.

A trio of eye bolts 69 are connected to the plate 41 and to the exhaust valve housing 86 to provide means for connecting a towing harness 71 to the sound source.

Proportioning solenoid valves 15 and 17 are initially activated until the pressure of explosive gas and oxygen mixture in the combustion chamber is sufficient to unseat the valve member 83. At this point the recorder is started. At the beginning of the recording interval of the recorder, the firing plugs 74 and 76 are activated by electrically energizing line 24 from the electrical source in the recorder in the usual manner. The gas flowing through the fuel manifold 79 will be ignited, and the ignition will quickly spread through the combustion chamber. As has been mentioned above, the valve member 83 has high inertia. This permits a relatively large pressure pulse to be produced inasmuch as the plates 41 and 37 will be forced almost to the limit of their movement as restricted by the bellows spring 43 and the bumper 85 before the valve member 83 unseats. After the valve member 83 is unseated, spent gases will rush out of the enclosure formed by the plates 37 and 41 and the spring member 43 until the valve member 83 is reseated on valve seat 81. The cooling of the gases within the combustion chamber produced by water flowing against the plates 41 and 37 will produce a partial vacuum within the chamber so that in combination with the external water pressure, the plates 41 and 37 will be quickly forced together and a partial vacuum produced within the combustion chamber. The bumper 57 restricts the extent to which the plates can be forced together to prevent damage of the spark plugs and the fuel manifold 79 by the plate 37 striking thereagainst. The vacuum produced within the chamber has the additional advantage of promoting mixing of the gas and oxygen when the gases are again injected into the chamber.

Generally speaking, only about 0.5-cubic-foot volume of gas mixture at 35 p.s.i. need by injected into the apparatus described above in order to achieve satisfactory results. A satisfactory seismic pulse can be produced when the volume of the combustion chamber expands from 0.5 cubic feet to about 2.0 cubic feet. Peneration of the earth by seimic waves to a depth of 20,000 feet and more can be effected using the apparatus described above.

Having described the principle of the invention and the best mode presently contemplated of applying that principle, it is to be understood that the apparatus is illustrative only and that other means can be employed without departing from the true scope of the invention.

We claim:

1. A seismic source for use submerged in an aqueous medium comprising:
   first and second opposed metal plates;
   an annular convoluted resilient elastomer member that is substantially impervious to gas, connecting together said plates to form therewith an expansible enslosure;
   actuating means connected to one of said plates to substantially instantaneously increase the pressure within said expansible enclosure to thereby produce a seismic pulse;
   said plates being rigid and dished inwardly of said enclosure.

2. The seismic source of claim 1 wherein said actuating means comprises means for introducing a combustible fluid into said enclosure and means for igniting said combustible fluid.

3. The seismic source of claim 1 wherein said plates are joined by a plurality of rods extending from one plate to the other and connected to said one plate and extending through the other, and resilient bumper members connected to said rod on both sides of said other member.

4. The seismic source of claim 3 wherein a second plurality of rods extends from said one member through said other member, and a plurality of elongated tubular members affixed to said other member, positioned around said second plurality of rods and in sliding engagement therewith.

5. The seismic source of claim 1 further including means including check valve means, connected to one of said plates, for venting the interior of said enclosure to the atmosphere when the pressure within said enclosure is of predetermined magnitude.

References Cited

UNITED STATES PATENTS

| | | | |
|---|---|---|---|
| 2,558,089 | 6/1951 | Horsley et al. | 181—.5 |
| 3,159,233 | 12/1964 | Clynch et al. | 181—.5 |
| 3,176,787 | 4/1965 | Roever | 181—.5 |
| 3,235,027 | 2/1966 | Kilmer | 181—.5 |
| 3,280,938 | 10/1966 | Tullos | 181—.5 |
| 3,301,345 | 1/1967 | Carder | 181—.5 |
| 3,347,336 | 10/1967 | Nash | 181—.5 |

BENJAMIN A. BORCHELT, *Primary Examiner.*

G. H. GLANZMAN, *Assistant Examiner.*